Patented Feb. 27, 1945

2,370,415

UNITED STATES PATENT OFFICE 2,370,415

MANUFACTURE OF MANGANESE OXIDE COMPOSITIONS

Paul R. Pine, Middleburgh Heights, Ohio, assignor to The Harshaw Chemical Company, Elyria, Ohio, a corporation of Ohio No Drawing. Application December 24, 1943, Serial No. 515,627

10 Claims. (Cl. 23—145)

This invention relates to manufacture of manganese oxide compositions and particularly to manufacture of a non-pyrophoric composition consisting largely of manganous oxide (MnO) and containing a small proportion of iron oxide.

Manganese occurs in nature in the form of Pyrolusite ($MnO_2$) Rhodocrosite ($MnCO_3$), etc. There are manganese ores containing MnO, $Mn_2O_3$ and $Mn_3O_4$ but for commercial use, $MnCO_3$ and MnO are difficult to obtain in suitable quantities. Practically, $MnO_2$ is the most readily available source of manganese, although MnO is a superior source material for a number of purposes. As an example of a process in which MnO is to be preferred to $MnO_2$, the production of manganese chloride may be noted. If a mol of MnO is reacted with two mols of HCl, one mole of manganese chloride is formed and one mol of water. ($MnO+2HCl \rightarrow MnCl_2+H_2O$) But if $MnO_2$ had been used in equivalent molecular proportions, there would have been formed one mol of $MnCl_2$, two mols of water and one mol of chlorine ($Cl_2$)

($MnO_2+4HCl \rightarrow MnCl_2+2H_2O+Cl_2$)

Since HCl is more expensive than chlorine, this conversion of HCl to chlorine is undesirable.

While chemists have long known means for converting $MnO_2$ to MnO, I have discovered a novel, cheap and at the same time surprisingly simple and effective method for obtaining MnO from $MnO_2$ or other manganese oxide higher in oxygen than MnO.

I have now discovered that if $MnO_2$ (or other oxide of manganese higher in oxygen than MnO or mixtures rich in $MnO_2$ or $Mn_2O_3$ or $Mn_3O_4$) and ferromanganese (or pure manganese metal) are mixed in suitable proportions, the resulting mixture can be caused to react with little or no application of heat beyond the small amount required for ignition of a localized portion to yield a composition largely consisting of MnO and iron oxide.

Suitable proportions are such as indicated by the following equations wherein ferromanganese is indicated as Mn(Fe).

Mn(Fe) +$MnO_2 \rightarrow$ 2MnO+iron oxide impurity
Mn(Fe) +$Mn_2O_3 \rightarrow$ 3MnO+iron oxide impurity
Mn(Fe) +$M_3O_4 \rightarrow$ 4MnO+iron oxide impurity The reaction is most energetic in the case where $MnO_2$ is used and in the other cases may require some externally applied heat in order to enable the reaction to propogate itself through the mass. When using $MnO_2$ or ores rich in $MnO_2$, I am able to heat a localized portion of the mixture to ignition temperature and have the reaction spread throughout the mass converting the ferromanganese and manganese oxides to MnO. A portion of the oxygen given up by the manganese oxide reacts with the iron content of the ferromanganese to yield iron oxide. This is not desirable but must be accepted unless in a case where manganese containing no iron might be available. The reaction may but need not be carried out in an enclosed space whereby to exclude or largely exclude air.

The reaction has been carried out in open air in a pile containing about a ton of a mixture of pyrolusite and ferromanganese. The pile was ignited by applying a blow torch to the pile at one point. The reaction propagated itself throughout the entire mass.

A surprising and very important feature of my invention is that I obtain a non-pyrophoric mass. At the temperature of the reaction by which it is formed, there is a reoxidation when air is freely admitted but this proceeds to a small depth only (typically about 2 mm.) and when the material has been allowed to cool, it may be ground and exposed to air without substantial reoxidation. This result was not to be expected since other means of reducing $MnO_2$ to MnO with which I am familiar result in a pyrophoric material which upon being ground reoxidizes extensively at ordinary temperatures.

If the reaction does not go entirely to completion, the result will nevertheless be valuable as the reaction approaches completion. Impurities can be tolerated to a considerable extent where the resulting product is to be used for manufacture of manganese chloride, sulfate, nitrate, acetate, formate, or the like. If some higher oxides of manganese than MnO are left in the product, there will result upon treatment of the mass with HCl some evolution of $Cl_2$. Iron oxide can be kept oxidized and thus undissolved or precipitated if it has become reduced and gone into solution by a deliberate use of some $MnO_2$ whereby a slight amount of chlorine is evolved. Normally the amount of ferromanganese used will be chosen with reference to the available manganese oxide ore in such amount as to leave a small amount of oxides higher than MnO thereby to evolve a little chlorine when the product is treated with HCl. The result is that the iron derived from the ferromanganese is kept oxidized and can be separated by filtration or decantation from the manganese chloride solution.

The pyrolusite or other ore or $MnO_2$ from any source should be finely divided. It should be 50 mesh and finer and preferably 100 mesh to 200 mesh or even finer. The ferromanganese should be 25 to 40 mesh or finer.

Carbonaceous material may be substituted for a portion of the ferromanganese. The amount of carbonaceous material may be, for example, only enough to compensate for the air mixed into the batch and gaining access thereto from the surrounding atmosphere or to minimize the latter effect by creating a reducing atmosphere above the batch. It may be omitted altogether. It may be substituted for as much as 10% of the ferromanganese required to reduce the $MnO_2$ or other oxide of manganese higher than MnO to MnO.

While I have emphasized the use of the MnO produced by my process for the production of $MnCl_2$, it is useful for the production of other salts and compounds of manganese, such as sulfate, acetate, nitrate, formate, etc.

*Example*

A batch was made up of 3200 pounds of ferromanganese containing 2496 pounds of Mn (78%) which had been pulverized to 40 mesh and finer, 6400 pounds of a manganese dioxide ore containing 5670 pounds of $MnO_2$ and 120 pounds of yellow pine sawdust. This batch was dry mixed, spread in a six inch thick layer and ignited. The reaction spread through the batch and the result was 9022 pounds of crude MnO cake which was then crushed. The so crushed cake contained some unreacted higher oxide and was found to be a non-pyrophoric material suitable for manufacture of manganese chloride.

In this example, the amount of oxygen which can be theoretically taken up by the ferromanganese is 719 pounds required to oxidize 2496 pounds of manganese to MnO plus 301 pounds required to convert the 704 pounds of iron to $Fe_2O_3$, a total of 1020 pounds. The amount of oxygen yielded by the 5670 pounds of $MnO_2$ is 1040 pounds. In this case the sawdust is relied upon merely to compensate for oxygen in the batch as air or in impurities, oxygen in the atmosphere surrounding the batch and to make a reducing atmosphere above the batch. More carbon could be used. For example, the ferromanganese used in this example could be reduced to 2133 pounds and in lieu thereof 120 pounds of coke or 240 pounds of yellow pine sawdust or 240 pounds of crankcase drainings could be substituted. It is, however, not necessary to use any carbonaceous material, and excellent results can be obtained without it.

What I claim is:

1. A process comprising forming a mixture of $MnO_2$ with ferromanganese and bringing at least a portion of said mixture to reaction temperature.

2. A process comprising forming a mixture of a material principally consisting of one or more oxides of manganese higher in oxygen than MnO with ferromanganese and bringing at least a portion of said mixture to reaction temperature.

3. A process comprising forming a mixture of a material principally consisting of one or more oxides of manganese higher in oxygen than MnO with ferromanganese in proportion approximating that which is theoretically required to reduce the higher manganese oxide to MnO and bringing at least a portion of said mixture to reaction temperature.

4. A process comprising forming a mixture of $MnO_2$ with ferromanganese in proportions approximating those theoretically required to reduce the $MnO_2$ to MnO and bringing at least a portion of said mixture to reaction temperature.

5. A process comprising intimately admixing a finely divided, dry, manganese dioxide ore and finely divided, dry, ferromanganese in proportions approximating the theoretical proportions required for reduction of the manganese dioxide to MnO and heating a localized portion of the resulting dry mass to reaction temperature.

6. A process comprising forming a mixture of a material which is predominantly $MnO_2$ with a material which is predominantly Mn and bringing at least a portion of said mixture to reaction temperature whereby to form a material which is predominantly MnO.

7. A process comprising forming a sensibly dry mixture of a manganese ore principally consisting of manganese oxides higher in oxygen than MnO with ferromanganese in proportion from 0.7 to 1.1 times that theoretically required to reduce the manganese oxides present to MnO, the ore being subdivided to pass 90% through a 50 mesh screen and the ferromanganese being subdivided to pass 90% through a 25 mesh screen, said mixture being then heated to reaction temperature at at least one point.

8. A process of producing non-pyrophoric MnO including intimately mixing a manganese dioxide ore with ferromanganese in proportion approximating that which is theoretically required to reduce the manganese oxide content thereof to MnO, heating a localized portion of the resulting mass to reaction temperature, allowing the reaction to proceed through the mass and the mass to cool and superficially reoxidize.

9. A process of producing non-pyrophoric MnO including intimately mixing a manganese dioxide ore with ferromanganese in proportion approximating that which is theoretically required to reduce the manganese oxide content thereof to MnO, heating a localized portion of the resulting mass to reaction temperature, allowing the reaction to proceed through the mass and the mass to cool and superficially reoxidize and then crushing the resulting cake.

10. A process of producing non-pyrophoric MnO including intimately mixing a manganese dioxide ore, ferromanganese and a carbonaceous material, the ferromanganese and carbonaceous material being proportioned with respect to the manganese dioxide in proportion from 0.7 to 1.1 times that theoretically required to reduce the manganese oxide content of the ore to MnO and heating at least a localized portion of the resulting mixture to reaction temperature and then allowing the reaction to proceed to completion and the mass to cool.

PAUL R. PINE.